US006366244B1

United States Patent
Fernandes

(10) Patent No.: US 6,366,244 B1
(45) Date of Patent: Apr. 2, 2002

(54) PLANAR DUAL BAND MICROSTRIP OR SLOTTED WAVEGUIDE ARRAY ANTENNA FOR ALL WEATHER APPLICATIONS

(75) Inventor: Roosevelt A. Fernandes, Chino Hills, CA (US)

(73) Assignee: Southern California Edison Company, Rosemead, CA (US)

( * ) Notice: Subject to any disclaimer, the term of this patent is extended or adjusted under 35 U.S.C. 154(b) by 0 days.

(21) Appl. No.: 09/444,332

(22) Filed: Nov. 19, 1999

Related U.S. Application Data

(63) Continuation-in-part of application No. 08/865,814, filed on May 30, 1997, which is a continuation-in-part of application No. 08/305,147, filed on Sep. 13, 1994, now Pat. No. 5,708,679, which is a continuation-in-part of application No. 08/029,897, filed on Mar. 11, 1993, now Pat. No. 5,379,320.

(51) Int. Cl.[7] .................................................. H01Q 1/38
(52) U.S. Cl. .............................. 343/700 MS; 343/776; 343/873; 343/770
(58) Field of Search ..................... 343/700 MS, 853, 343/872, 873, 770, 772, 776, 771, 767

(56) References Cited

U.S. PATENT DOCUMENTS

| | | |
|---|---|---|
| 4,071,846 A | 1/1978 | Oltman, Jr. |
| 4,808,916 A | 2/1989 | Smith-Vanez |
| 4,901,307 A | 2/1990 | Gilhousen et al. |
| 4,926,189 A | 5/1990 | Zaghpuhl et al. |
| 4,943,811 A | 7/1990 | Alden et al. |
| 4,979,170 A | 12/1990 | Gilhousen et al. |
| 5,005,023 A | * 4/1991 | Harris .......................... 343/756 |
| 5,019,831 A | * 5/1991 | Yee et al. .................... 343/771 |
| 5,455,594 A | 10/1995 | Blasing et al. |
| 5,510,803 A | * 4/1996 | Ishizaka et al. ....... 343/700 MS |
| 5,977,710 A | * 11/1999 | Kuramoto et al. ... 343/700 MS |
| 6,101,399 A | * 8/2000 | Raleigh et al. ............. 455/561 |

\* cited by examiner

Primary Examiner—Don Wong
Assistant Examiner—Shih-Chao Chen
(74) Attorney, Agent, or Firm—Oppenheimer, Wolff & Donnelly

(57) ABSTRACT

Antennas useable in all types of weather conditions are disclosed for use in various applications. The antenna is a flat array with either microstrip or slotted waveguide radiating elements. The radiating elements can be either transmitting or receiving elements for the array, or can be two arrays, each dedicated to one half of the transmission link. The array is covered with a radome to prevent water droplets, ice, or snow from forming on the antenna surface, thus allowing beam launching or beam reception at the antenna surface. The antennas can be used in a wide field of applications, including microsatellite communications links. Also disclosed is a microstrip, dual-band phased array antenna having a top dielectric including an antenna array patch directly coupled to a receive feed network and a lower dielectric having a transmit feed that is coupled to the antenna array patch through an intermediate metallization layer having coupling slots.

100 Claims, 9 Drawing Sheets

Ku-BAND, 14.22 GJ$_z$, H-PLANE DUAL FREQUENCY PATCH ARRAY ANTENNA BEAM PATTERN SQUARE ORIENTATION

Ku-BAND, 14.32 GJ$_z$, H-PLANE DUAL FREQUENCY PATCH ARRAY ANTENNA BEAM PATTERN SQUARE ORIENTATION

Ku-BAND, 14.22 GJ$_Z$, H-PLANE DUAL FREQUENCY PATCH ARRAY ANTENNA BEAM PATTERN WITH OPTIMUM SIDE-LOBE REDUCTION USING UNIQUE DIAMOND ARRAY CONFIGURATION

PLANAR DUAL BAND MICROSTRIP OR SLOTTED WAVEGUIDE ARRAY ANTENNA FOR ALL WEATHER APPLICATIONS

RELATED APPLICATIONS

The present application is a continuation-in-part of U.S. patent application Ser. No. 08/865,814 filed May 30, 1997, which is a continuation-in-part of U.S. patent application Ser. No. 08/305,147, filed Sep. 13, 1994, now U.S. Pat. No. 5,708,679, entitled "Ultra Small Aperture Terminal Satellite Communication Network," which is a continuation-in-part of U.S. patent application Ser. No. 08/029,897, filed Mar. 11, 1993, now U.S. Pat. No. 5,379,320, entitled "Hitless Ultra Small Aperture Terminal Satellite Communication Network". The contents of the above-mentioned applications are incorporated by reference herein.

BACKGROUND

1. Field of the Invention

This invention is related to radio frequency (RF) antennas, and particularly to planar dual band array antennas operable in adverse weather conditions, and fully integrated with the RF housing, including baseband electronics.

2. Background of the Invention

The operation of a mini-hub and multiple remote terminals in a hitless or a non-redundant configuration, along with multiple mini-hub satellite earth stations communicating with numerous remote satellite earth stations are described in the parent applications. The present invention is concerned with flat array antennas that operate in a wide range of weather conditions and physically coupled to the RF housing and baseband at electronics in a fully integrated outdoor configuration.

In order to maintain communication throughout all types of weather conditions, antennas typically use a dish that is angled in such a manner that the dish will not collect rain or snow. In locations with heavy snow various methods are used to "heat" the antenna. Further, the dish is sized to ensure that even in poor transmission conditions, the signal strength will be large enough to receive a clear signal.

However, dish antennas tend to be heavy, bulky devices that take up a large amount of space and often require concrete foundations. Further, the dish antennas must sometimes be moved to align the dish with the satellite that the dish communicates with, which requires not only large motors, but a large spatial volume in order to operate. The RF section consisting of the feedhorn, up-down converters, and other interconnections are exposed to the weather. At higher frequencies used in satellite communications this contributes to poor reliability.

Previous attempts at fabricating flat array antennas have had problems with reliable RF transmissions because precipitation, whether it is rain, snow, or sleet, have greatly reduced the signal strength to unacceptable levels for satellite transmission and reception. These conditions would cause communications to cease during periods of precipitation, which would be unacceptable for users that a need reliable, consistent communications link.

It is desirable to have a small flat antenna that can send and receive signals in all types of weather conditions. The flat array antenna that can operate in all weather conditions is also desirable in terms of size, maneuverability, and cost.

An additional adverse environmental condition on a satellite earth station antenna is its exposure to direct sunlight. Such exposure tends to unduly heat the electronics incorporated into a satellite earth station. Such an increase in operating temperature for the electronics may cause reliability problems, as well as adversely effects its operating performance. Therefore, there is need for an RF antenna housing that protects or shields the earth station antenna electronics from significant exposure to direct sunlight.

An additional drawback of prior art RF antennas is that the baseband electronics is remotely located from the RF antenna housing. More specifically, in prior art antenna systems, baseband electronics is located indoors, whereas the RF antenna housing is located outdoors. Because the baseband electronics is located in a different area than the RF antenna housing, relatively long cables are required to couple the RF antenna housing to the baseband electronics. These cables can have a length of up to 1,000 feet. As a result, noise creeps in the antenna system via the long cable. In addition, the RF signals residing in the long cables can also interfere with sensitive indoor electronics through electromagnetic interference (EMI). Furthermore, the long cables further attenuates the RF signals resulting in a lower signal-to-noise ratio. It would be desirable that the signal residing in the long cables be in digital format and at a lower baseband frequency. Accordingly, there is a need for a system which eliminates this long cable connection for transmitting RF signals.

Yet another drawback of flat array antenna systems is that they require a flat array patch for transmitting that is separate from the flat array patch for receiving. Because two flat array patches are required, prior art flat array antenna systems typically require a relatively large footprint to accommodate both antenna patches. As a result, prior art antenna systems take up substantial amount of space, which is undesirable. Accordingly, there is a need for an antenna system that uses a single flat array antenna patch to serve both as a transmitter and a receiver for the system.

SUMMARY OF THE INVENTION

According to the invention, a planar antenna for all weather applications comprises. an antenna array, a radome with appropriate dielectric constant and mechanical strength, properly spaced from the array, and a housing. The antenna array comprises at least one radiating element that interfaces to waveguides or microstrip feed structures.

The radiating elements, which can be either dual-fed patch array (with the same patch serving to transmit for example ku-band and receive x-band) or microstrip dipole transmission lines or slotted waveguides, are microstrip fed or are aligned to the waveguide corporate feed structure to ensure proper coupling. The array can also be aligned to each other to assure that the main beams (lobes) of the array pattern are aligned on a common target, typically a satellite.

The parent application describes remote USAT terminal communications equipment which utilizes a local reference frequency for acquisition and tracks the received carrier frequency during normal communications. The local reference frequency is voltage controlled to maintain a close match to the carrier frequency.

One method of practicing the present invention is to screen print electrical RF circuits on flexible dielectric substrate materials to provide the ability to manufacture precision arrays of various sizes. This provides a cost-effective antenna even in small quantities. The present invention thus provides a low-cost flat antenna array. The configuration facilitates the use of flexible printed wiring materials in the construction of flat antenna arrays.

Another method. of practicing the present invention is to make a slotted waveguide array. The slots are precision machined or stamped and can vary in size depending on the desired frequency and gain for the antenna.

Accordingly, an object of the present invention is to provide a flat antenna array of radiating elements that is operable in a wide range of weather conditions.

Also disclosed is an antenna array comprising a top dielectric having a top metallization layer patterned into an antenna array patch and a first feed network having a first port, the first feed network configured to couple signals within a first frequency band between the antenna array patch and the first port. The antenna array also includes a bottom dielectric including a bottom metallization layer patterned into a second feed network having a second port and a radiating element, wherein the second feed network is configured to couple signals within a second frequency band between the second port and the radiating element. The antenna array further includes an intermediate metallization layer disposed between the top dielectric and the bottom dielectric, wherein the intermediate metallization layer includes openings for coupling signals within the second frequency band between the antenna array patch and the second feed network.

Further objectives and advantages of this invention will become apparent from the following description and drawings.

DETAILED DESCRIPTION OF THE INVENTION

Overview

Presently, microwave communication systems employ reflector antennas, commonly called "dish antennas," with feedhorns to achieve medium to high-gain signal amplification and higher system performance. These antennas require precise alignment between the feedhorn and reflector. In addition, the received beam has to be totally focused into the feedhorn by the reflector to achieve maximum performance from the aperture. The same is true for the transmit beam which has to be reflected by fully illuminating the surface of the reflector. As a result, these antennas are not as efficient in achieving maximum efficiency for a given aperture. These antennas are also labor intensive to install and are not as rugged as the flat array antenna of the present invention.

It has been recognized that a flat array antenna would overcome many of the drawbacks of a reflector antenna, however, up to now the flat array antenna has not achieved equivalent performance. There has been considerable difficulty in achieving the required gain and pattern from an array antenna to match the performance of an equivalent reflector antenna. The present invention overcomes the limitation of previous flat array antennas.

Flat array antennas of the microstrip dipole balanced array, unbalanced microstrip arrays, and slotted array antennas even with coated materials, glued-on sheets with appropriate dielectric constants experience catastrophic degradation in heavy rain, melting snow, etc. Droplets forming at or near a slotted array antenna or on dipoles cause passive array antennas to lose signal strength due to two primary effects on the launched beam at Ku, X-band and Ka band frequencies: beam scattering, and the inherent loss of standing wave beam coherency because of the beam scattering, and microwave signal absorption due to the water molecules.

In the copending CIP application the dipole flat array antenna is disclosed in detail. The present invention makes both flat array antennas, including the slotted array antenna workable in heavy rain or snow precipitation conditions. It also demonstrates how the entire antenna, RF electronics, and baseband electronics can be integrated avoiding any exposure of critical RF elements and interconnections in a manner that can allow satisfactory outdoor performance during heavy precipitation. It discloses the first fully integrated antenna, RF transceiver and baseband electronic satellite communications controller, including the digital interface to customer terminal equipment that can be used indoors or outdoors.

System Overview

Figure 1:
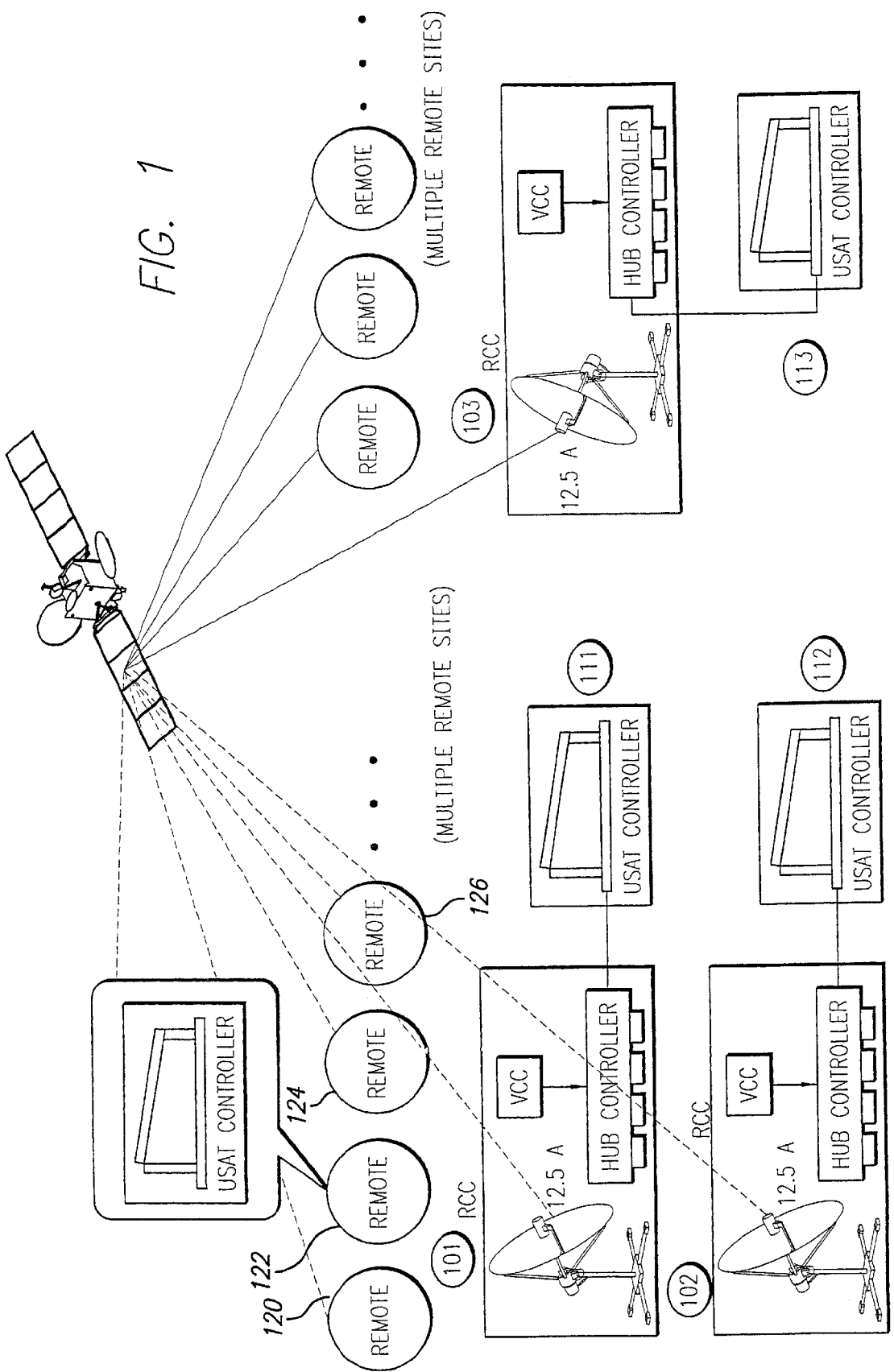
FIG. 1 is a communication system configuration using a USAT network.

A mesh mini-hub network topology as shown in FIG. 1 allows communications to be rerouted to Regional Control Centers without taking down any portion of the operating network. Each mini-hub terminal, 101, 102 and 103, etc., transmits a packet of information consisting of a preamble plus a stream of bits to remote Ultra Small Aperture Terminals (USAT) satellite terminals 120, 122, 124, and 126. and 127. The transmissions are spread spectrum encoded to reduce power spectral density and allow reception and transmission of signals by remote flat USAT's 120, 122, 124, and 126. The simultaneous transmissions from remote terminals are Code Division Multiple Access and all network terminals are time synchronized to gain the benefits of TDMA to achieve maximum signal-to-noise ratio.

Ultra small flat aperture antennas use flat passive arrays suitable for high-volume production methods akin to fabrication of printed circuits using screen printing precision manufacturing techniques.

The multiple mini-hub terminals transmit their packets in a sequential manner each within an allocated time slot. This creates a Time Division Multiple Access capability in combination with the spread spectrum encoded signals. Each of the USAT remote terminals receives the sequence of packets, each packet representing a non-continuous signal transmitted by the different mini-hub terminals 101, 102, 103, etc. Using numerical processing techniques described in the parent application, the remote terminal acquires the spread spectrum code phase and signal frequency without losing track, as the mini-hub terminals transmit in a TDMA format. The frequency synthesizers at the remote terminals maintain track through a combination of memory, stability and superfast signal lock for small excursions, even though the mini-hub signals are discontinuous.

All mini-hub signals are synchronized through GPS derived time signals which facilitate rapid tracking and stability. In order to facilitate the acquisition, the signals transmitted by each mini-hub terminal is close to one another with regard to signal frequency and spread spectrum code phase. A USAT terminal 111, 112, 113, etc. is collocated with each mini-hub terminal and communicates with the mini-hub terminal through a direct interface. The collocated USAT terminal transfers the received data packets plus any variations in spread spectrum code phase and signal frequency to the mini-hub terminal.

Any one of the many mini-hub terminals can be designated as the master. All other mini-hub terminals adjust their spread spectrum code phases and their frequencies so that they are in alignment with the designated master mini-hub terminal. Each remote terminal receives the packets from all mini-hub terminals. Each mini-hub terminal also receives the transmissions from all remote USAT terminals. Mini-hub terminals may directly communicate with other mini-hub terminals via their collocated USAT terminals.

A missing packet in the data set transferred from the remote USAT terminal to the mini-hub terminal indicates a failure of the corresponding mini-hub terminal. Based on an apriori redundancy plan, the designated mini-hub terminal will take over the function of the failed mini-hub terminal. This enhances the overall reliability of a supervisory control and data acquisition system using satellite communications.

Antenna Array Assembly

Figure 2:
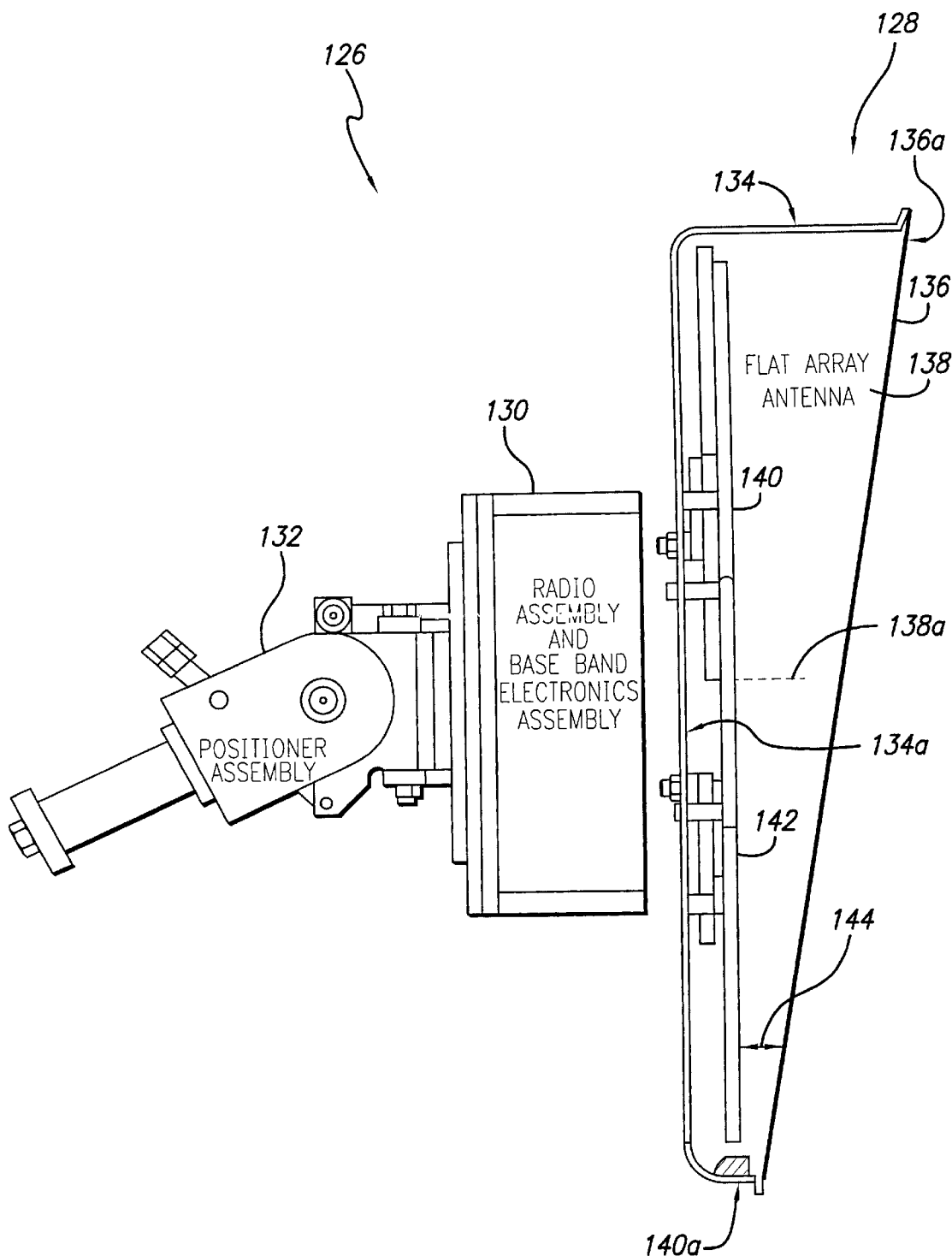
FIG. 2 is an assembly layout for the antenna assembly, radio housing assembly, and positioner.

FIG. 2 is an assembly layout for the antenna assembly, radio housing assembly, and positioner.

FIG. 2 shows remote USAT terminal 126, typical of a remote terminal in the system, in more detail. Remote terminal 126 can be used for any application that requires a different antenna, and is shown as part of the array antenna (or vice versa) USAT system for illustrative purposes only.

The components of USAT terminal 126 are the antenna assembly 128, the radio and baseband electronics assembly 130, and the positioner assembly 132.

The positioner assembly 132 allows the end user to accurately position the antenna assembly to any angle in azimuth, elevation, and polarization (3-axis) that is desired for alignment of the USAT terminal with any desired satellite. The slope of the radome surface with respect to the antenna array plane is chosen to account for snow loading, rain, high wind, or other conditions. The slope of the radome with a selected dielectric material 136a with respect to the flat array antenna within the trapezoidal cross sectional housing is optimized to reduce the amount of snow-loading. Further, the positioner 132 allows for rapid repositioning of the antenna assembly 128.

Radio assembly 130 contains the electronics to transmit and receive information via the communications link with the satellite. Typically, the radio assembly 130 will down-convert any communications link information from high frequency to a baseband frequency to limit the signal losses within the system. Further, the radio assembly 130 will upconvert baseband signals to transmission frequencies to limit transmission losses in the system. An aperture 134a in the housing is located at the normal axis 138a to a plane of the antenna array 138.

Antenna assembly 128 contains a housing 134, a radome 136, and an array assembly 138.

The housing 134 is typically a vacuum formed ABS plastic material, but can be other materials. The housing 134 surrounds the array assembly 138 in every direction but the reception end of the array assembly 138 on the opposite face. The housing typically has a drain hole 140 to allow any moisture within the housing 134 to drain away from the array assembly 138. The drain hole 140a is typically a permeable member, such as Gore-Tex (tm), but can be an open hole if desired.

The radome 136 is typically a fiberglass PTFE composite material, but can be other materials, so long as the radome 136 material is transparent to the microwave frequencies used by the array assembly 138. The radome 136 may be multiple materials if desired.

The radome 136 and housing 134 create a weatherproof cover for the antenna array 134. This weatherproof housing is designed such that any precipitation is kept at a given distance away from the radiating elements of the array assembly 138 to allow for beam launching and minimize water absorption of the microwave energy being transmitted and received by the array assembly 138.

The array assembly 138 can be either a microstrip or slotted array antenna. The array assembly 138 can be one radiating element, or more than one radiating element, depending on the application for the antenna. For simplicity the disclosure is made using the slotted array assembly 138 nominally operating at 14 GHz in the transmit mode and 12 GHz in the receive mode. One skilled in the art will note that other modes of operation, such as an all transmit antenna, an all receive antenna, or antennas operating at different frequencies or varying frequencies are possible with the present invention.

Array elements 140 comprise the transmit section of the array assembly 138. Array elements 142 comprise the receive section of array assembly 138. To maximize antenna efficiency, spacing 144, defined as the distance from the plane of array assembly 138 and the plane of radome 136, must be greater than one half wavelength of the transmit and receive frequencies used by the array assembly 138. The radome 136 is shown to create a trapezoidal angle with the plane of array assembly 138; this trapezoid can be used to prevent snow loading at proper angles. However, other shapes of the radome 136 and slight variations on the plane of array assembly 138 could be used to alter the performance characteristics of antenna assembly 128.

Antenna Array Layout

Figure 3:
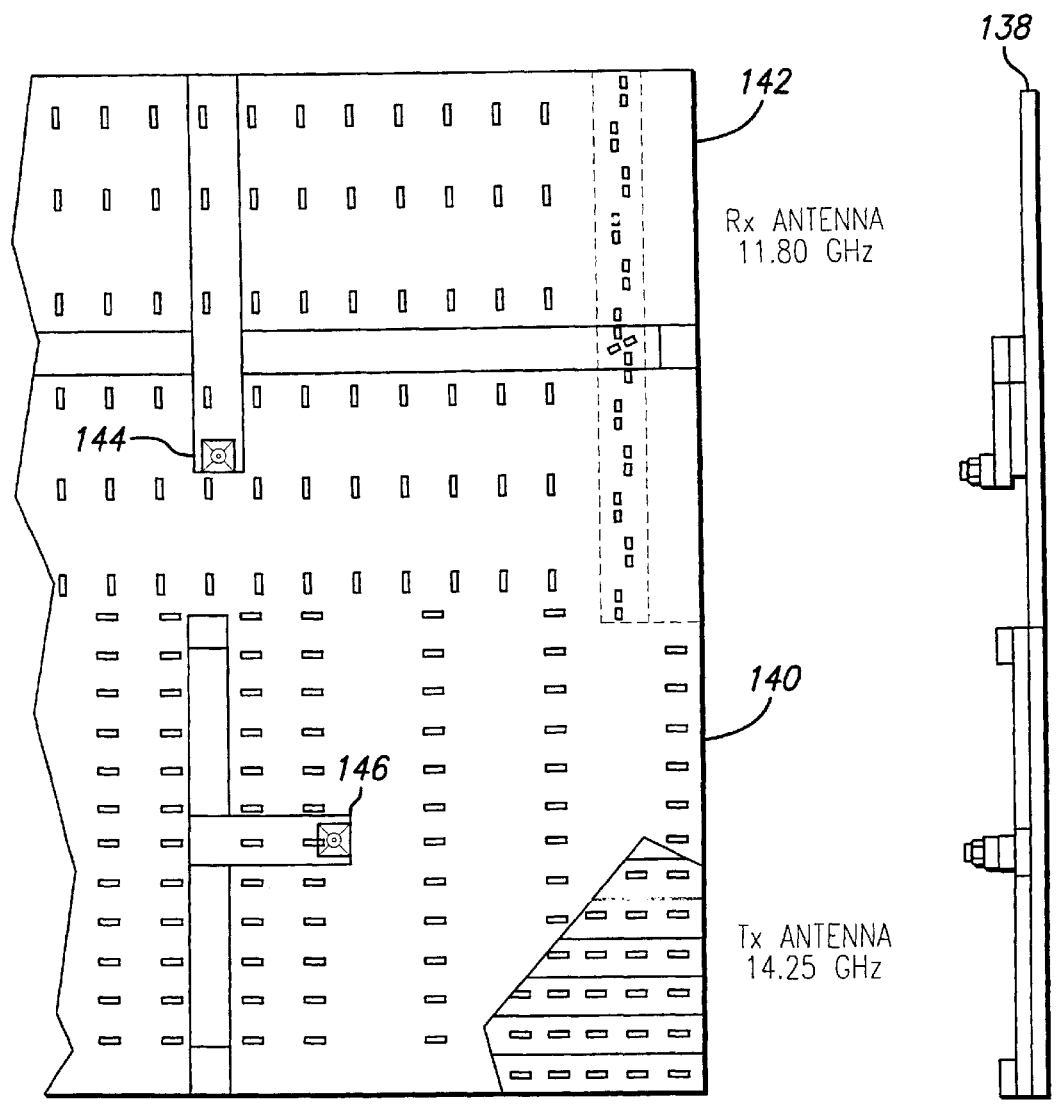
FIG. 3 shows a layout for the antenna arrays.

FIG. 3 shows a layout for the antenna arrays.

FIG. 3 shows a side view of array assembly 138 similar to that of FIG. 2. The front view of array assembly 138 is also shown, to show that the slots in the array elements 140 in the transmit section are orthogonal to the array elements 142 in the receive section of the array assembly 138. The use of horizontal polarization in the array elements 142 and vertical polarization in the array elements 140 is for illustrative purposes only, and other polarizations, including a singular polarization for the entire array assembly 138, are contemplated with the present invention. Connectors 144 and 146 are shown to illustrate the connections to the transmit and receive portions of the antenna. However, a single connection could be made using diplexers if desired.

The structural thickness of a slotted array antenna 138 can typically be about 0.25 inches as manufactured by MDM, Inc. with a maximum thickness below 1.5 inches at the input SMA input connector 146 location. For satellite communications the desired gain needs to be achieved with adequate clear weather link margins to withstand the severe attenuation during precipitation conditions exceeding 2 to 3 inches per hour.

The transmit array is made up of shunt radiating slots as shown. The slots are housed and illuminated by contiguous waveguides in a corporate feed arrangement. The radiating aperture waveguides are back-fed through centrally located waveguides 148. The transmit and receive main beam peaks need to be aligned to an accuracy level better than 0.5 degrees by ensuring waveguide planar symmetry.

The slot sizes and arrangements of the transmit and receive antennas 140 and 142 are dictated by the operating transmit and receive frequencies. However, to reduce interference the transmit and receive frequency beams are arranged orthogonal to each other and require dual polarization frequency assignments on the satellite. The number of coupling slots for the receive feed array 142 may be different from the transmit feed array 140.

The slotted array antennas 140 and 142 are very robust mechanically. However, as droplets form near or on the slots the antenna gain drops to unusable levels for satellite communications, particularly for applications where reliable and continuous communications links are necessary.

Prior methods of overcoming the problems associated with flat antennas use sheets of polyimide or other RF transparent material attached directly to the plane of the array assembly 138 in order to seal the array assembly 138 from precipitation. These approaches have failed to allow the beam to be launched into the air-dielectric interface, because the water resident on the sealing material absorbs or scatters the microwave beam. Both beam scattering and corresponding lack of coherency and absorption effects. cause a majority of the attenuation right at the slots prior to one half-wavelength separation from the surface.

Similarly, when snow initially sticks to the surface of the sealing material, the water molecules again absorb and scatter microwave energy within the first half wavelength distance from the antenna. This absorption and scattering causes signal degradation and loss of signal strength, which eventually causes loss of the communications link. Further, the degradation of surface treatment materials to reduce surface tension of water or snow does not give satisfactory performance over long periods of time.

Trapezoidal Shape of the Housing

Another aspect of the housing 134 that reduces the attenuation that would otherwise occur during heavy snow conditions is the slope of the radome 136 with respect to the housing 134.. The trapezoidal cross section with respect to the vertical plane can be selected to ensure that the total weight of the wet snow that would stick to the surface and be held against the force of gravity by surface tension does not exceed the maximum allowed to achieve the desired link margin under the worst weather conditions from the standpoint of antenna gain. This effect can also be achieved by tilting the antenna housing 134 to prevent snow loading, but this may require the antenna to be refocused or larger in size to account for misalignment with the target satellite.

Antenna Beam Patterns

FIGS. 4–7 illustrate antenna beam patterns for the slotted array antennas.

Figure 4:
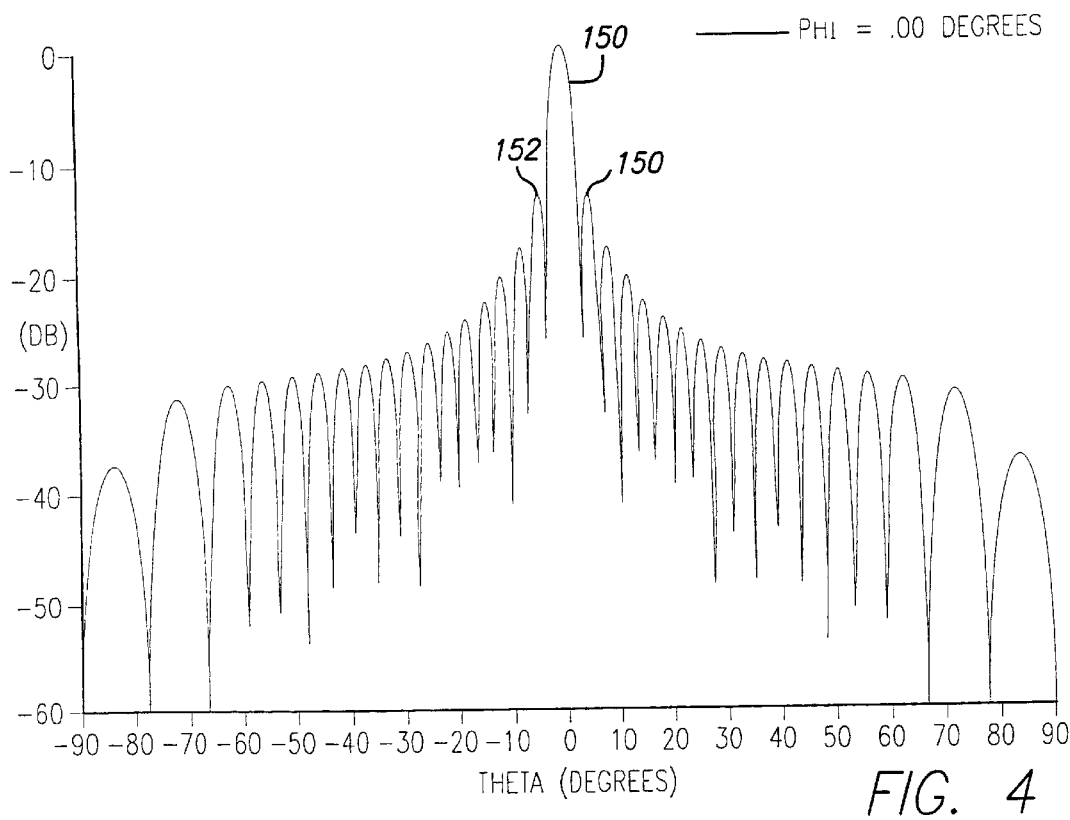
FIGS. 4–7 illustrate antenna beam patterns for the array antennas.

FIG. 4 shows the transmit array 140 operating at 14.20 Gigahertz with a Phi of 0 degrees. Note that the first side lobes 150 are at an approximately −13 dB level from the main beam 152, and are at approximately 8 degrees off center.

Figure 5:
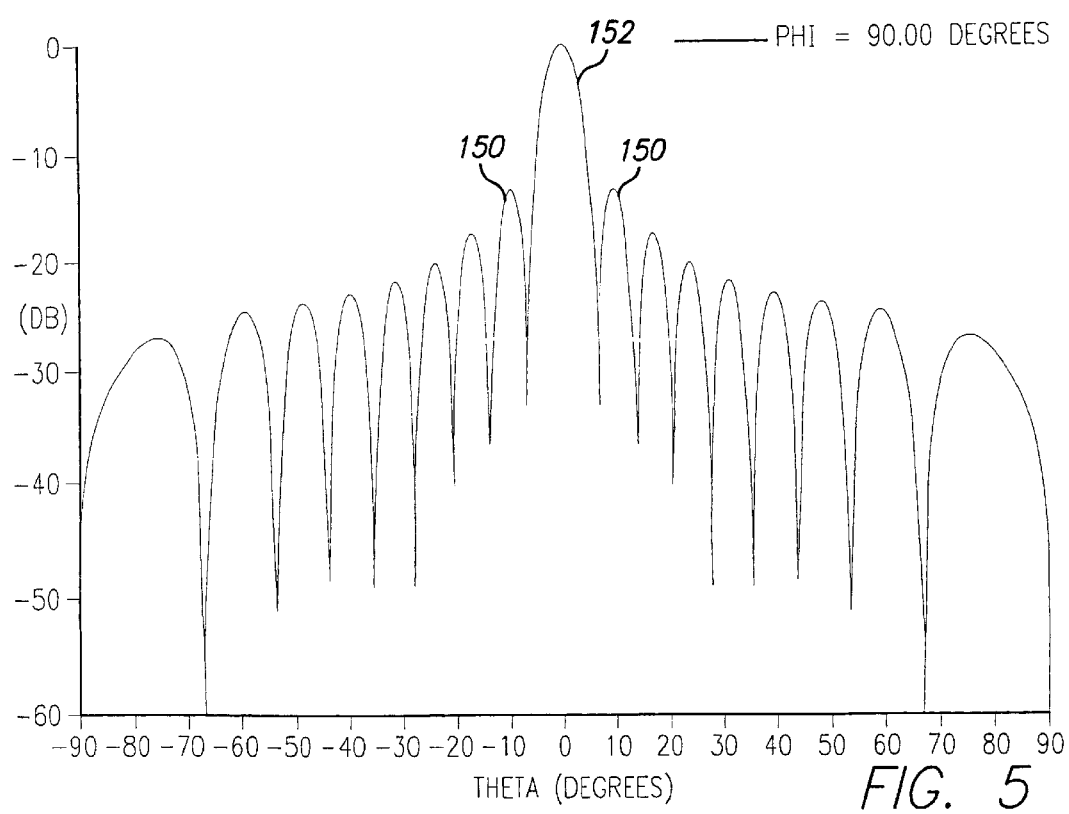

FIG. 5 shows the transmit array 140 operating at 14.20 Gigahertz with a Phi of 90 degrees. Note that the first side lobes 150 are at an approximately −13 dB level from the main beam 152, and are at approximately 10 degrees off center.

Figure 6:
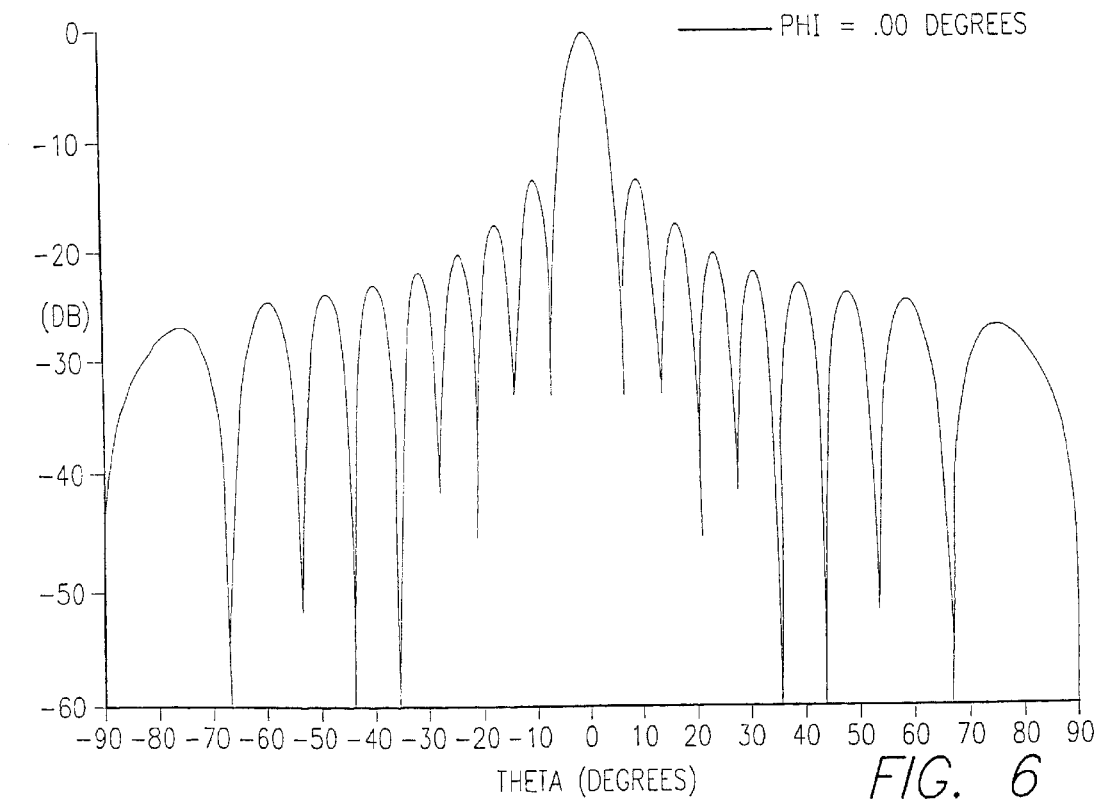

FIG. 6 shows the receive array 142 operating at 11.75 Gigahertz with a Phi of 0 degrees. Note that the first side lobes 150 are at an approximately −15 dB level from the main beam 152, and are at approximately 10 degrees off center.

Figure 7:
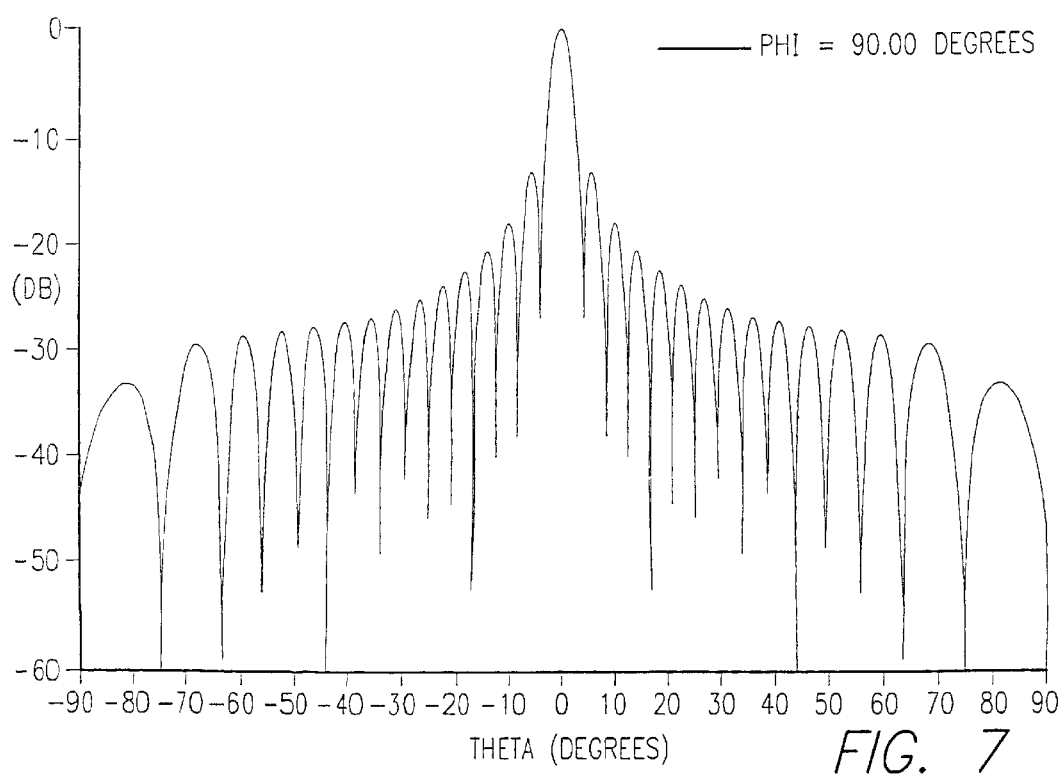

FIG. 7 shows the receive array 142 operating at 11.75 Gigahertz with a Phi of 90 degrees. Note that the first side lobes 150 are at an approximately −13 dB level from the main beam 152, and are at approximately 8 degrees off center.

In practice, the beam pattern is altered by tapering the vertical and horizontal sides of the square antenna patch to achieve a 17 to 20 dB reduction from the main beam peak amplitude. This is required to meet FCC constraints imposed to reduce interference with other satellite.

Dual-Band Microstrip Phased Array Antenna

FIGS. 8A–8E illustrate an exemplary embodiment of a dual band microstrip flat array antenna 200 in accordance with another aspect of the invention. The dual band flat array antenna 200 allows for transmitting of signals within a transmit frequency band and receiving signals within a receive frequency band using only a single antenna flat array patch element. The antenna 200 uses two feeds to transmit and receive signals to and from the flat array patch in their respective frequency bands. The feeds are configured to orthogonally polarize the transmit signals with respect to the receive signals to reduce cross-coupling. Because the new flat array antenna 200 only requires a single flat array patch, it uses substantially less footprint to employ. This makes the antenna much lighter in weight, less expensive to manufacture, and easier to install. These characteristics are highly desirable for USAT satellite terminals, and other applications.

In the preferred embodiment, the dual band phased array antenna 200 is configured into a three-layer structure in a diamond configuration. In the diamond configuration, the vertical and horizontal polarization are achieved along the diagonals of the square array antenna. Thus, the diamond configuration is inherently tapered in the vertical and horizontal polarization direction. This results in a substantial reduction of the side lobe power, which the FCC requires to reduce interference with other satellites. In the square orientation, the vertical and horizontal polarizations are parallel to the respective sides of the square array antenna. The dual-band phased array antenna 200 can also be configured into a square orientation. However, the sidelobe power may not meet the FCC requirements unless the square array antenna is tapered along the vertical and horizontal polarization direction.

The top layer of the three-layer structure of the flat array antenna 200 comprises a flat array antenna patch 214 which can transmit and receive signals within respective transmit and receive frequency bands. The flat array antenna patch 214 is coupled to a receive feed network 202. The flat array antenna patch 214 and receive feed network 202 are formed on a substrate 204 in a microstrip configuration. An intermediate layer of the flat array antenna 200 comprises a sheet of metal 206 which serves both as a ground plane as well as a coupling element to inductively couple the transmit signals from a lower layer to the flat array antenna patch 202. The lower layer of the flat array antenna 200 comprises a microstrip feed network 210 for coupling the transmit signals to the flat array antenna patch 202 by way of the coupling element 206. The transmit feed network 210 is formed on a substrate 208 in a microstrip configuration.

In the preferred embodiment, the receive feed network 202 comprises a feed port 212 for coupling the receive signal therethrough. The feed port 212 comprises a metallized via hole that extends from the top layer 202 down to the lower layer 210. The feed port 212 is coupled to a plurality of individual phased array patches 214 by way of first level power dividers 216, second level power dividers 218, and third level power dividers 220. The feed port 212 and power dividers 216, 218 and 220 are designed to substantially operate optimally for frequencies within the receive frequency band. The individual patches 214 are configured to receive signals that are horizontally and linearly polarized, and transmit signals that are vertically and linearly polarized. The phased array antenna patch 214 is formed of a thin-film metal layer disposed on a low-loss substrate 204, which may comprise Duriod, mylar or other low-loss materials.

In the preferred embodiment, the metal sheet 206 is formed of a thin film metal layer that is deposited and etched on the bottom of substrate 204. Alternatively, the thin-film metal sheet 206 can also be deposited and etched on the top side of substrate 208. The metal sheet 206 serves as a ground plane for the microstrip flat array antenna patch 214 and the microstrip transmit and receive feed networks 210 and 202. The metal sheet 206 also includes a plurality of openings 222 (e.g. slots) for coupling the transmit signal from the transmit feed network 210 to the flat array antenna patch 214. The slots 222 are substantially optimized for inductively coupling signals within the transmit frequency band and also configured to produce a vertical linearly polarized transmit beam.

In the preferred embodiment, the transmit feed network 210 includes a feed port 224 coupled to a plurality of radiating elements 226 by way of first level power dividers 228, second level power dividers 230, and third level power dividers 232. The transmit feed port 210 may also include an impedance matching network, such as open-ended stubs 234 and 236, in proximity to the feed port 224 to improve the impedance matching at the feed port 224. The feed port 224, the impedance matching network (e.g. stubs 234 and 236, power dividers 224, 226, and 228, and the radiating elements 226 are designed to substantially operate optimally at the transmit frequency band. The transmit feed network 210 is formed of a thin-film metal layer disposed on a low-loss substrate 208, which may comprise Duriod, mylar or other low-loss materials.

Figure 8A:
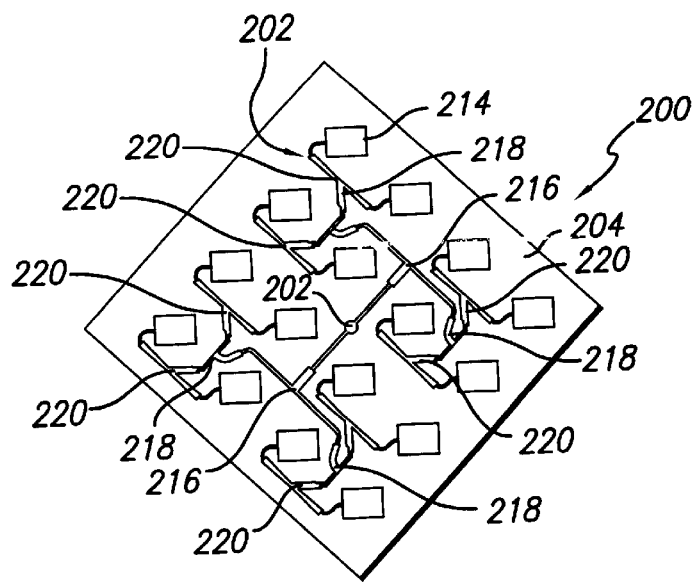
FIGS. 8A–8E illustrate an exemplary embodiment of a dual band microstrip phased array antenna.
Figure 8B:
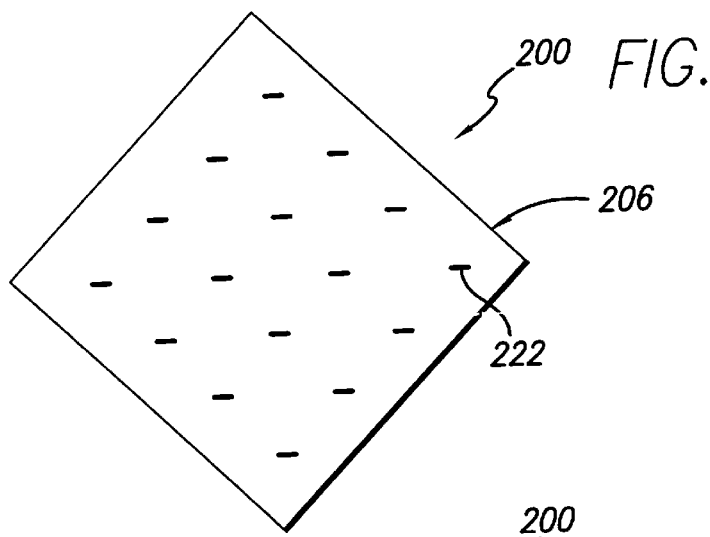
Figure 8C:
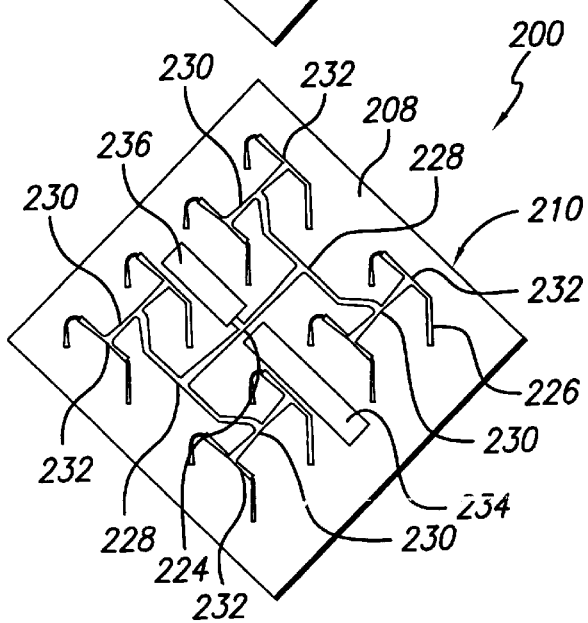
Figure 8D:
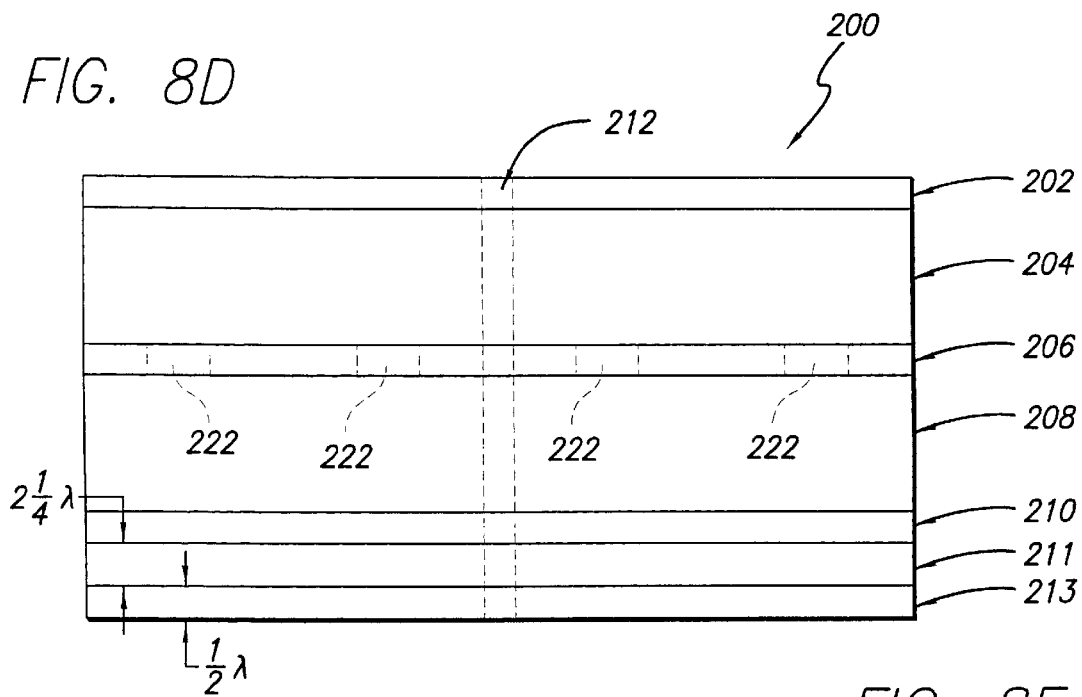
Figure 8E:
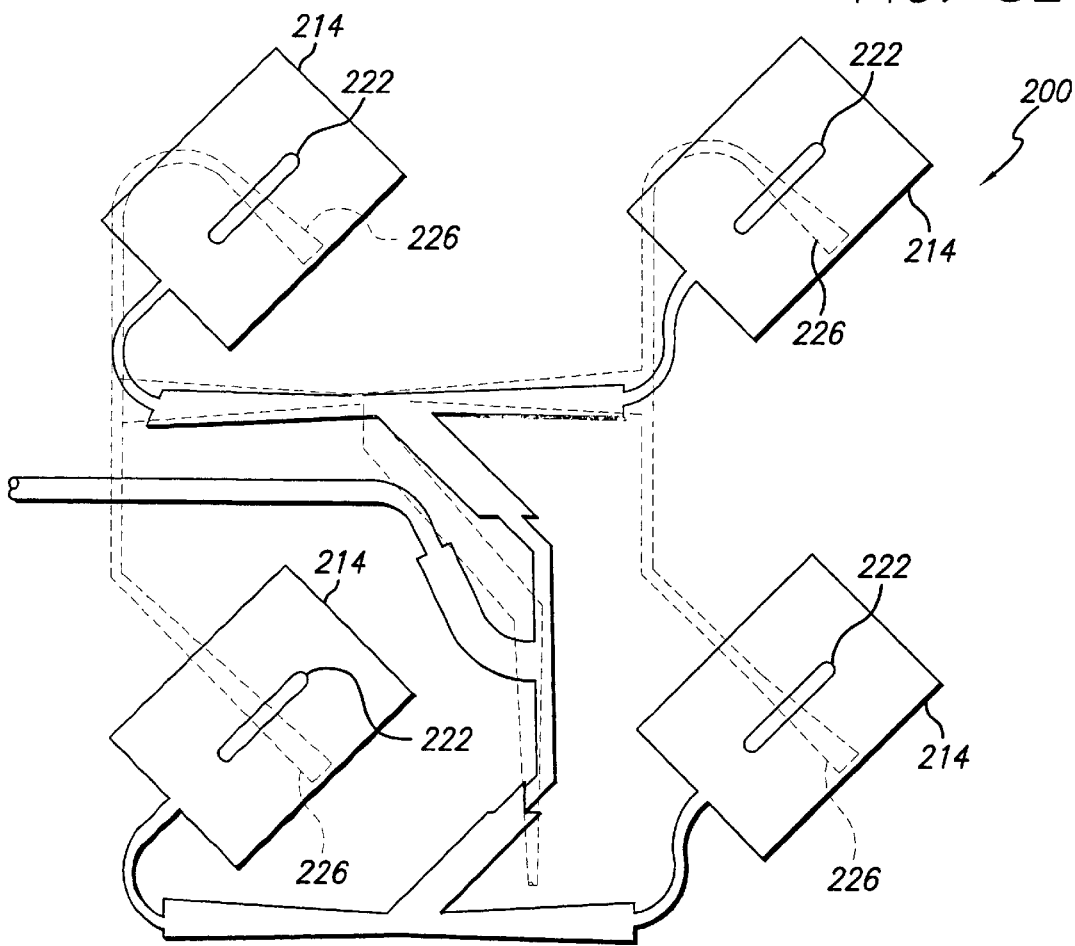

In the preferred embodiment, the layers 202–210 are vertically stacked on top of each other, as shown in FIG. 8D. Also, the inductively coupling elements 226, the slots 222, and the individual flat array patches 214 are aligned vertically as shown in FIG. 8E to substantially maximize the coupling between the inductively coupling elements 226 and the individual array patches 214. The three-layer array antenna 200 is disposed over a foam type substrate 211 preferably at least a quarter wavelength thick at the lower operating frequency of the antenna. The foam 211 is, in turn, disposed on a flat metal ground plane 213 which is preferably at least a half wavelength thick.

In operation, the flat array antenna patch 214 receives a horizontally and linearly polarized signal at a receive frequency band, such as for example 11.7–12.2 GHz (x-band), and delivers this received signal to the feed port 212 by way of the power dividers 220, 218 and 216. The feed port 212 is coupled to a downconverter (not shown) for downconverting the received signal to the baseband (or intermediate frequency) for further processing.

At the same time (or not necessarily at the same time), a transmit signal having frequencies within a transmit band, such as for example 14–14.5 GHz (Ku-band) is introduced into the transmit feed network 210 by way of the feed port 224 from an upconverter (not shown). The transmit feed network 210 distributes the transmit signal to each of the radiating elements 226 by way of power dividers 228, 230 and 232. The transmit signal is inductively coupled from the feed elements 226 through respective slots 222 and to the individual patches 214 to form a vertical linearly polarized transmit beam. The polarization of the transmit signal being substantially orthogonal to that of the received signal improves the cross-coupling isolation for the new flat array antenna 200.

Although in the preferred embodiment the top layer feed network 202 is designed for the receive frequency band, it shall be understood that it can also be designed for the transmit frequency band. If such is the case, the feed port 212 and the power dividers 216, 218 and 220 are designed to substantially operate optimally at the transmit frequency band. Likewise, the lower layer feed network 210 and slots 222 can also be designed for the receive frequency band. If such is the case, the feed port 224, impedance matching network (e.g. slots 234 and 236), power dividers 228, 230 and 232, and the slots 222 are designed to substantially operate optimally at the receive frequency band. The flat array antenna 200 may be coupled in parallel to other like or non-like flat array antennas to form a larger flat array antenna. For example, sixteen (16) of the flat array antenna 200 may be coupled together to form an 18-by-18 inch flat array antenna.

The flat array antenna 200 may be employed in a weather-resistant housing, such as antenna assembly 128 described in this assembly. As previously stated, the flat array antenna 200 may be used for satellite communicating terminals such as USAT. The antenna 200 may also be employed on satellites or point-to-point stations or relay stations. This antenna 200 may also be used in radar systems, such as ground based radar systems or airborne radar systems. There are many numerous applications for the flat array antenna 200, which one skilled in the relevant art would appreciate.

Figure 9A:
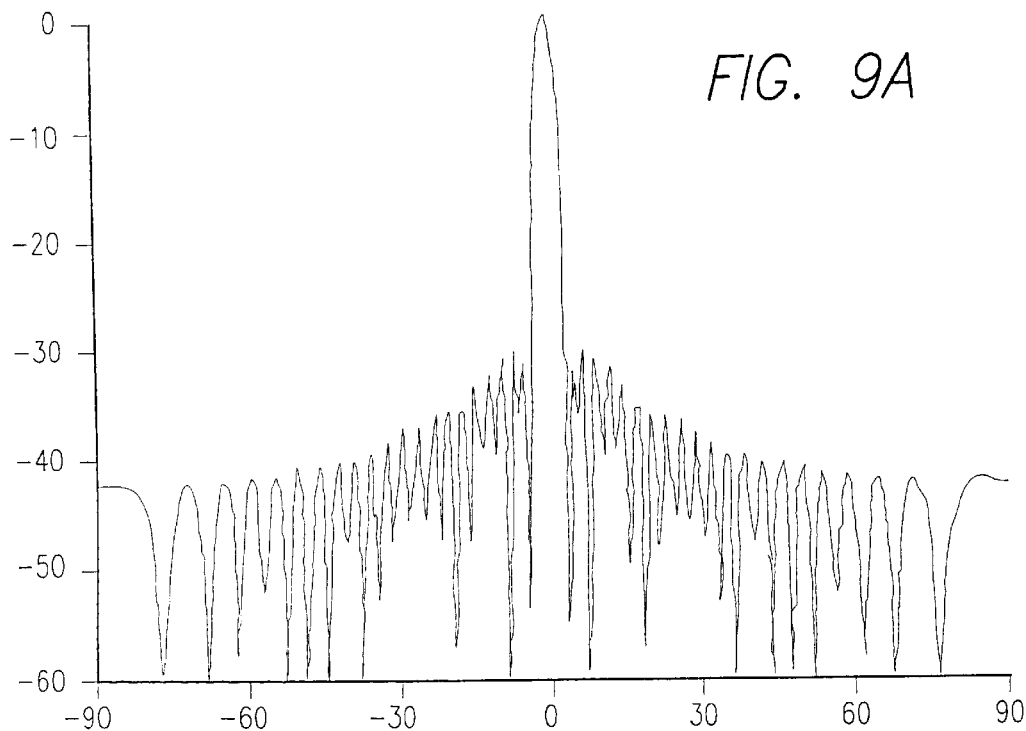
FIGS. 9A–9C illustrate graphs showing the antenna beam pattern for the exemplary dual band microstrip antenna array of FIG. 8.
Figure 9B:
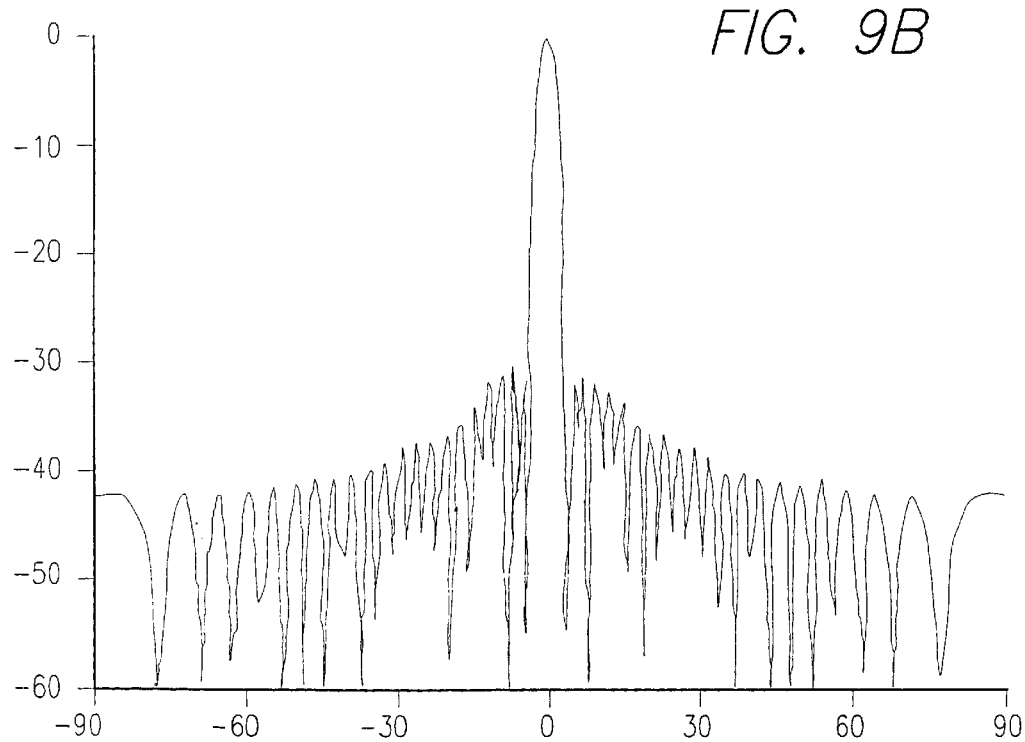
Figure 9C:
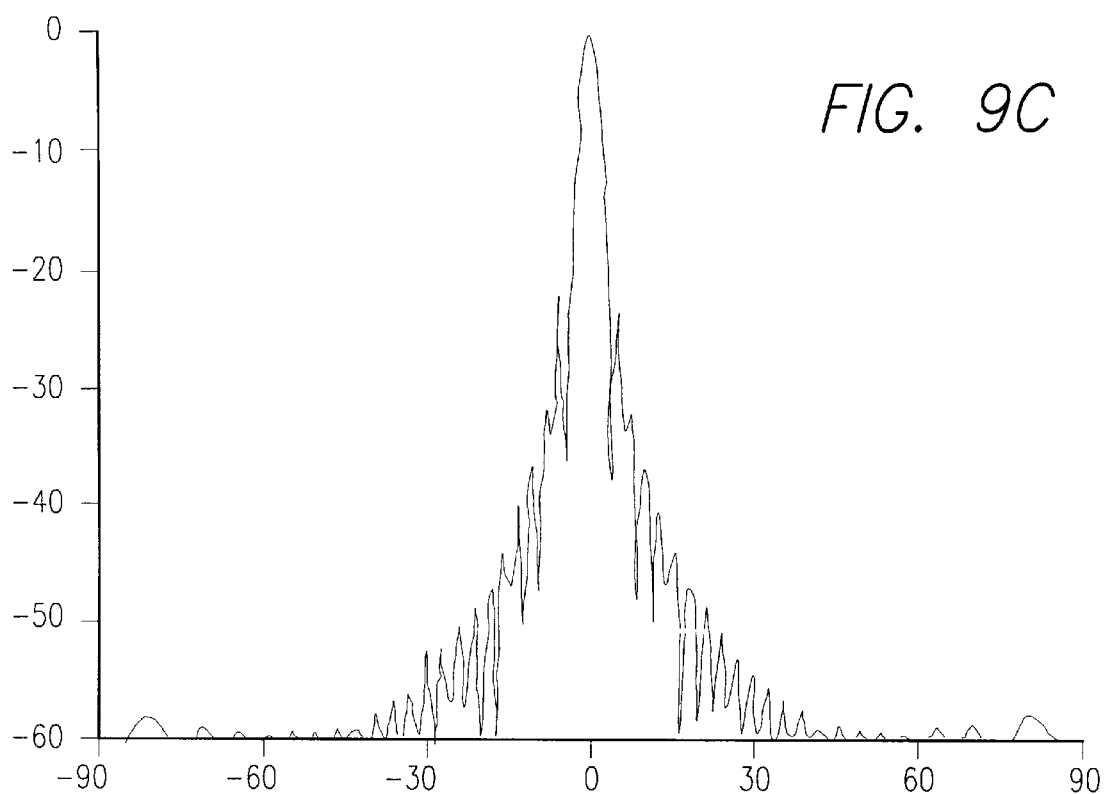

FIGS. 9A–9C illustrate examples of the beam pattern for the flat array antenna 200 of the invention. Specifically, FIG. 9A illustrates the beam pattern for the flat array antenna 200 transmitting at 14.22 GHz. FIG. 9A illustrates the beam pattern for the flat array antenna 200 transmitting at 14.32 GHz. And, FIG. 9C illustrate the beam pattern for the flat array antenna 200 transmitting at 14.22 GHz using a diamond array configuration.

General

The above description of the invention is illustrative only. Various changes in the application and details of the illustrative apparatus and method may be made within the scope of the appended claims without departing from the spirit of the invention.

For instance, by the term "flat" array is meant an array which is substantially planar or curvilinear. In some situations, the flat array may be curved to conform to a shape of a base member, for instance a cylindrically shaped sensor on a power transmission line. In that event, the dipole spacing or transmission line configuration may be varied to set up the appropriate configuration for the flat array.

The enclosure as described, coupled with aperture distribution fulnctions selected to achieve desired gain and beam width requirements, radiating slots consistent with the operating frequencies, and desired bandwidth, input admittance and VSWR characteristics, proper termination of the array feed waveguides, radiating array short-circuits, and matching input waveguides, provides satisfactory performance even in heavy precipitation conditions exceeding 3"/hour.

The invention discloses an integrated dual band flat array antenna for use in various applications. It is important to note that the present invention entirely eliminates the need for feedhorns, flexible waveguides and other microwave RF moisture-sensitive elements from direct exposure to the environment, and provides a practical cost-effective approach for the commercial application of flat array antennas, whether of the microstrip or slotted flat array variety, to a wide range of applications.

The invention is to be determined solely on the terms of the following claims. When such claims are formulated as system claims, these are to be understood in multiple different respects, namely respectively as either system claims, product claims and as method claims. Thus the term "system" should be understood to mean system, apparatus or method.

What is claimed is:

1. An antenna assembly, comprising:
an antenna array housing having an aperture, the array defining the aperture and being located within an upper dielectric housing and a metallic base plate, the base plate being a ground plane;
a flat antenna array situated within said antenna array housing and aligned with said aperture in a manner that a normal axis to a plane of said antenna array extends through said aperture; and
a surface of the housing positioned to substantially cover said aperture, wherein a distance of said surface of the housing and said antenna array is greater than a half wavelength at an operating frequency of said antenna array, the surface of the housing being spaced from the antenna array at one end of the array a distance geater than the spacing from the array at an opposite end of the array.

2. The antenna assembly of clam 1, wherein the surface of the housing is substantially planar.

3. The antenna assembly of claim 1, wherein the antenna array is used for transmitting a signal.

4. The antenna assembly of claim 1, wherein the antenna array is used for receiving a signal.

5. The antenna assembly of claim 1, wherein a single antenna array is used for transmitting a first signal and receiving a second signal.

6. The antenna assembly of claim 5, wherein the first and second signals are at different frequencies.

7. The antenna assembly of claim 1, wherein the surface of the housing and the ground plane form a trapezoidal cross section.

8. The antenna assembly of claim 1, including at least one radiating element, the radiating element being a patch.

9. The antenna assembly of claim 1, including at least one radiating element, the radiating element being a slotted waveguide.

10. The antenna assembly of claim 1, wherein the antenna array is substantially planar.

11. The antenna assembly of claim 1, wherein the housing further comprises a drain hole aperture.

12. The antenna assembly of claim 11, wherein the drain hole aperture is covered with a water-permeable material.

13. The antenna assembly of claim 1, wherein the surface of the housing includes more than one material.

14. The assembly of claim 1, wherein the array is a slotted array comprising more than one array of radiating elements.

15. The antenna assembly of claim 7, wherein the array is substantially planar.

16. The antenna assembly of claim 7, including at least one radiating element being a patch.

17. The antenna assembly of claim 7, including at least one radiating element being a slotted waveguide.

18. The antenna assembly of claim 7, wherein the housing further including a drain hole aperture.

19. The antenna assembly of claim 18, wherein the drain hole aperture is covered with a water-permeable material.

20. The antenna assembly of claim 7, wherein the array comprises more than one array of radiating elements.

21. An antenna assembly, comprising:
an antenna array housing having an aperture;
an antenna array situated within said antenna array housing and aligned with said aperture in a manner that a normal axis to a ground plane of said antenna array extends through said aperture; and
a surface of the housing positioned to substantially cover said aperture, wherein the surface of the housing and the antenna ground plane form a trapezoidal cross section for allowing snow or rain to slide off said surface of the housing.

22. The antenna assembly of claim 21, wherein the surface of the housing is essentially planar.

23. The antenna assembly of claim 21, wherein the antenna array is used for transmitting a signal.

24. The antenna assembly of claim 21, wherein the antenna array is used for receiving a signal.

25. The antenna assembly of claim 21, wherein the antenna array is used for transmitting a first signal and receiving a second signal.

26. The antenna assembly of claim 25, wherein the first and second signals are at different frequencies.

27. The antenna assembly of claim 21, including at least one radiating element, the radiating element being a patch.

28. The antenna assembly of claim 21, including at least one radiating element, the radiating element being a slotted waveguide.

29. The antenna assembly of claim 21, wherein the antenna array is substantially planar.

30. The antenna assembly of claim 21, wherein the housing further comprises a drain hole aperture.

31. The antenna assembly of claim 30, wherein the drain hole aperture is covered with a water-permeable material.

32. The antenna assembly of claim 21, wherein the surface of the housing includes more than one material.

33. The antenna assembly of claim 21, wherein the array is a slotted array, the slotted array comprises more than one array of radiating elements.

34. The antenna assembly of claim 21, wherein the array is substantially planar, and wherein the surface of the housing and the antenna array ground plane form a trapezoid cross section.

35. An integrated satellite earth station, comprising:
an antenna array for receiving a received signal and transmitting a transmit signal;
a radio assembly coupled to said antenna array, for downconverting said received signal to a baseband received signal and/or upconverting a baseband transmit signal into said transmit signal;
a baseband electronic circuit for processing said baseband received signal and processing said baseband transmit signal, the received signal and transmit signal having orthogonal polarizations; and
a housing for integrally housing said antenna array, said radio assembly and said baseband electronic circuit.

36. The satellite earth station of claim 35, further including a 3-axis positioner assembly for moving said housing in an azimuth and/or elevation direction and polarization for a specific satellite.

37. The satellite earth station of claim 35, wherein said housing comprises a first compartment for housing said antenna array and a second compartment for housing said radio assembly and said baseband electronic circuit.

38. The satellite earth station of claim 35, wherein said antenna array is positioned within said housing so as to shield said radio assembly and said baseband electronic circuit from direct sunlight during the operation of said radio assembly.

39. The satellite earth station of claim 35, wherein the array includes at least one radiating element slotted waveguide.

40. An antenna array, comprising:
a top dielectric having a top metallization layer patterned into antenna array radiating patches and a first feed network, said first feed network configured to couple signals within a first frequency band between said antenna radiating patches a bottom dielectric having a bottom metallization layer patterned into a second feed network being inductively coupled through openings of a dimension selected for the operating second frequency, said second feed network being configured to couple signals within a second frequency band and said radiating elements;

an intermediate metallization layer disposed between said top dielectric and said bottom dielectric, said intermediate metallization layer including openings, the openings being of a dimension selected for the operating frequency of the second feed network for coupling signals within said second frequency band between said antenna array and said second feed network; and the antenna array radiating patches being substantially a square and being arranged substantially as a diamond configuration ad the patches being disposed thereby to achieve horizontal and vertical polarization along diagonals of the substantially square array antenna.

41. The antenna array of claim 40, wherein said first feed network is coupled to said antenna array patches in a manner that the first feed network can receive horizontal linearly polarized signals sensed by said antenna array.

42. The antenna array of claim 40, wherein said second feed network is coupled to said antenna array patches in a manner that the antenna array patches can produce a vertical linearly polarized transmit beam.

43. The antenna array of claim 40, wherein said first feed network is coupled to said antenna array patches in a manner that the first feed network can receive linearly polarized signals sensed by said antenna array patches.

44. The antenna array of claim 40, wherein said second feed network are coupled to said antenna array patches in a manner that the antenna array patches can produce a linearly polarized transmit beam.

45. The antenna array of claim 40, wherein the openings of said intermediate metallization layer are coupled to said antenna array patches in a manner that the antenna array patches can produce a vertical linearly polarized transmit beam.

46. The antenna array of claim 40, wherein the openings of said intermediate metallization layer are coupled to said antenna array patches in a manner that the antenna array can produce a horizontal linearly polarized transmit beam.

47. The antenna array of claim 40, wherein the openings of said intermediate metallization layer are coupled to said antenna array patches in a manner that the second feed network can receive horizontal linearly polarized signals sensed by said antenna array patches.

48. The antenna array of claim 40, wherein the openings of said intermediate metallization layer are coupled to said antenna array patches in a manner that the second feed network can receive vertical linearly polarized signals sensed by said antenna array patches.

49. The antenna array of claim 40, wherein said first feed network is coupled to said antenna array patches in a manner that the first feed network can receive horizontal linearly polarized signals sensed by said antenna array patches, and wherein the openings of said intermediate metallization layer are coupled to said antenna array patches in a manner that the antenna array patches can produce a vertical linearly polarized transmit beam.

50. The antenna array of claim 40, wherein said first feed network are coupled to said antenna array patches in a manner that the first feed network can receive vertical linearly polarized signals sensed by said antenna array patches, and wherein the openings of said intermediate metallization layer are coupled to said antenna array patches in a manner that the antenna array patches can produce a horizontal linearly polarized transmit beam.

51. The antenna array of claim 40, wherein said first feed network are coupled to said antenna array patches in a manner that the antenna array patches can produce a horizontal linearly polarized transmit beam, and wherein the openings of said intermediate metallization layer are coupled to said antenna array patches in a manner that the second feed network can receive vertical linearly polarized signals sensed by said antenna array patches.

52. The antenna array of claim 40, wherein said first feed network are coupled to said antenna array patches in a manner that the antenna array patches can produce a vertical linearly polarized transmit beam, and wherein the openings of said intermediate metallization layer are coupled to said antenna array patches in a manner that the second feed network can receive horizontal linearly polarized signals sensed by said antenna array patches.

53. The antenna array of claim 40, wherein said intermediate metallization layer serves as a ground plane.

54. The antenna array of claim 40, wherein the array radiating patches are substantially diagonally aligned relative to the array.

55. The antenna array of claim 40, wherein the second feed network ends in terminals, the terminals being disposed relative to the openings such that the terminals and openings are substantially orthogonally aligned relative to each other.

56. An integrated satellite earth station, comprising:

an antenna array for receiving a received signal and/or transmitting a transmit signal, the received signal and transmit signal having orthogonal polarizations;

a ground plane for the antenna;

a radio assembly coupled to said antenna array, for downconverting said received signal to a baseband received signal and/or upconverting a baseband transmit signal into said transmit signal;

a baseband electronic circuit for processing said baseband received signal and processing said baseband transmit signal the received signal having orthogonal polarizations;

a housing for integrally housing said antenna array, said radio assembly and said baseband electronic circuit; and a surface of the housing being substantially planar to substantially cover the array, the surface of the housing being spaced from the array by at least a half wavelength of the operating frequency of the array.

57. The satellite earth station of claim 56, further including a 3-axis positioner assembly for moving said housing in an azimuth and/or elevation direction and polarization for a given satellite.

58. The satellite earth station of claim 56, wherein said housing comprises a first compartment for housing said antenna array and a second compartment for housing said radio assembly and said baseband electronic circuit.

59. The satellite earth station of claim 56, wherein said antenna array is positioned within said housing so as to shield said radio assemblly and said baseband electronic circuit from direct sunlight during the operation of said antenna assembly.

60. The satellite earth station of claim 56, wherein the surface of the housing and the ground plane form a trapezoidal cross section.

61. The satellite earth station of claim 57, wherein the surface of the housing and the ground plane form a trapezoidal cross section.

62. The satellite earth station of claim 58, wherein the surface of the housing and the ground plane form a trapezoidal cross section.

63. The satellite earth station of claim 59, wherein the surface of the housing and the ground plane form a trapezoidal cross section.

64. The satellite earth station of claim 56, wherein the array includes at least one radiating element.

65. The satellite earth station of claim 58, wherein the array includes at least one radiating element.

66. The satellite earth station of claim 59, wherein the array includes at least one radiating element.

67. The satellite earth station of claim 60, wherein the array includes at least one radiating element.

68. The satellite earth station of claim 56, wherein the array includes at least one radiating element slotted waveguide.

69. The satellite earth station of claim 68, wherein the array includes at least one radiating element slotted waveguide.

70. The satellite earth station of claim 59, wherein the array includes at least one radiating element slotted waveguide.

71. The satellite earth station of claim 60, wherein the array includes at least one radiating element slotted waveguide.

72. A satellite earth station as claimed in any one of claims 56, 57, 58, 59, 60, 67 or 71 wherein the surface of the housing is positioned with the ground plane to form a trapezoidal cross section such that, when in use, the antenna array is directed at a first angle relative to vertical, and the surface of the housing is directed at a second angle relative to the vertical thereby allowing snow or rain to slide off said surface of the housing.

73. A satellite earth station as claimed in any one of claims 60 to 63 wherein, in use, the spacing of the surface of the housing relative to the array is greater at a top of the array assembly than at a bottom of the array assembly.

74. An antenna array, comprising:
a top dielectric having a top metallization layer patterned into an antenna patch and a first feed network having a first port, said first feed network configured to couple signals within a first frequency band between said antenna array and said first port;
a bottom dielectric having a bottom metallization layer patterned into a second feed network including a second port, said second feed network configured to inductively couple signals within a second frequency band between said second port and said antenna patch; and
an intermediate metallization layer disposed directly between said top dielectric and said bottom dielectric, wherein said intermediate metallization layer including openings for coupling signals within said second frequency band between said top dielectric antenna patch and said second feed network, such that there are only one microstrip patch elements serving both frequency bands.

75. An antenna array, comprising:
a top dielectric having a top metallization layer patterned into an antenna array patch and a first feed network having a first port, said first feed network configured to couple signals with a first frequency band between said antenna array patch and said first port;
a bottom dielectric having a bottom metallization layer patterned into a second feed network including a second port, said second feed network configred to inductively couple signals within a second frequency band between said second port and said array patch;
an intermediate metallization layer disposed between said top dielectric and said bottom dielectric, wherein said intermediate metallization layer including openings for coupling signals within said second frequency band between said antenna array patch and said second feed network; and
a configuration for excitation of the radiating element to thereby obtain a reduction of side lobe power of at least 17 dB relative to a main beam.

76. An antenna array, comprising:
a top dielectric having a top metallization layer pattered into antenna aray radiating patches and a first feed network having a first port, said first feed network configured to couple signals within a first frequency band between said antenna array radiating patches and said first port in a diamond configuration;
a bottom dielectric having a bottom metallization layer patterned into a second feed network including a second port, said second feed network configured to inductively couple signals within a second frequency band between said second port and said radiating patches;
an intermediate metallization layer disposed between said top dielectric and said bottom dielectric, wherein said intermediate metallization layer including openings for inductively coupling signals within said second frequency band between said antenna array radiating patches and said second feed network; and
the diamond configuration for the array being such that, without tapering, there is a reduction of side lobe power of at least about 17 dB relative to a main beam.

77. The antenna array of any one of claims 74, 75 or 76 wherein the antenna array is substantially a square and is arranged substantially as a diamond configuration and the patch being arranged to be horizontally and vertically disposed thereby to achieve horizontal and vertical polarization along diagonals of the substantially square array antenna.

78. The antenna array of claims 74, 75, or 76, wherein said first feed network is coupled to said antenna array patches in a manner that the first feed network can receive horizontal linearly polarized signals sensed by said antenna array patches.

79. The antenna array of claims 74, 75, or 76, wherein said second feed network is coupled to said antenna array patch in a manner that the antenna array patches can produce a vertical linearly polarized transmit beam.

80. The antenna array of claims 74, 75, or 76, wherein the openings of said intermediate metallization layer are coupled to said antenna array patches in a manner that the antenna array patches can produce a vertical linearly polarized transmit beam.

81. The antenna array of claims 74, 75, or 76, wherein the openings of said intermediate metallization layer are coupled to said antenna array patches in a manner that the antenna array patches can produce a horizontal linearly polarized transmit beam.

82. The antenna array of claims 74, 75, or 76, wherein the openings of said intermediate metallization layer are coupled to said antenna array patches in a manner that the second feed network can receive horizontal linearly polarized signals sensed by said antenna array patches.

83. The antenna array of claims 74, 75, or 76, wherein the openings of said intermediate metallization layer are coupled to said antenna array patches in a manner that the second feed network can receive vertical linearly polarized signals sensed by said antenna array patches.

84. The antenna array of claims 74, 75, or 76, wherein said first feed network is coupled to said antenna array patches in a manner that the first feed network can receive horizontal linearly polarized signals sensed by said antenna array patches, and wherein the openings of said intermediate metallization layer are coupled to said antenna array patches in a manner that the antenna array patches can produce a vertical linearly polarized transmit beam.

85. The antenna array of claims 74, 75, or 76, wherein said first feed network is coupled to said antenna array patches in a manner that the first feed network can receive vertical linearly polarized signals sensed by said antenna array patches, and wherein the openings of said intermediate metallization layer are coupled to said antenna array patches in a manner that the antenna array patches can produce a horizontal linearly polarized transmit beam.

86. The antenna array of claims 74, 75, or 76, wherein said intermediate metallization layer serves as a ground plane for inductive coupling through a matched slotted array.

87. An antenna assembly, comprising:
an antenna array housing having an aperture;
a flat antenna array situated within said antenna array housing and aligned with said aperture in a manner that a normal axis to a plane of said antenna array extends through said aperture;
a surface of the housing positioned to substantially cover said aperture, wherein a distance of said surface of the housing and said antenna array is greater than a half wavelength at an operating frequency of said antenna array, the surface of the housing being spaced from the antenna array at one end of the array a distance greater than the spacing from the array at an opposite end of the array; and
the antenna array including
a top dielectric having a top metallization layer patterned into antenna array patches and a first feed network having respective first ports, said first feed network configured to couple signals within a first frequency band between said antenna array patches and said respective first ports;
a bottom dielectric having a bottom metallization layer patterned into a second feed network including respective second ports, said second feed network configured to inductively couple signals within a second frequency band between said respective second ports and said radiating patches of a first layer;
an intermediate metallization layer disposed between said top dielectric and said bottom dielectric, wherein said intermediate metallization layer includes slot openings for inductively coupling signals within said second frequency band between said antenna array patches and said second feed network; and
the antenna array being substantially a square and being arranged substantially as a diamond configuration to achieve horizontal and vertical polarization along diagonals of the substantially square array antenna.

88. An antenna assembly, comprising:
an antenna array housing enclosing a flat antenna aperture;
a flat antenna array situated within said antenna array housing and aligned with said aperture in a manner that a normal axis to a plane of said antenna array extends through said aperture;
a surface of the housing positioned to substantially cover said aperture, wherein a distance of said surface of the housing and said antenna array is greater than a half wavelength at an operating frequency of said antenna array, the surface of the housing being spaced from the antenna array at one end of the array a distance greater than the spacing from the array at an opposite end of the array; and
the antenna array including
a top dielectric having a top metallization layer patterned into an antenna array radiating patches and a first feed network having respective first ports, said first feed network configured to couple signals within a first frequency band between said patches and said respective first ports;
a bottom dielectric having a bottom metallization layer patterned into a second feed network including respective second ports, said second feed network configured to inductively couple signals within a second frequency band between said respective second ports and said radiating patches; and
an intermediate metallization layer disposed directly between said top dielectric and said bottom dielectric, wherein said intermediate metallization layer includes slotted openings for inductively coupling signals within said second frequency band between said antenna array patches and said second feed network, such that there is only one element with radiating patches serving to both transmit and receive frequencies for both bands.

89. An antenna assembly, comprising:
an antenna array housing enclosing a flat antenna aperture;
a flat antenna array situated within said antenna array housing and aligned with said aperture in a manner that a normal axis to a plane of said antenna array extends through said aperture;
a surface of the housing positioned to substantially cover said aperture, wherein a distance of said surface of the housing and said antenna array is greater than a half wavelength at an operating frequency of said antenna array, the surface of the housing being spaced from the antenna array at one end of the array a distance greater than the spacing from the array at an opposite end of the array; and
the antenna array including
a top dielectric having a top metallization layer patterned into antenna array radiating patches and a first feed network having respective first ports, said first feed network configured to inductively couple signals within a first frequency band between said antenna array patch and said first port;
a bottom dielectric having a bottom metallization layer patterned into a second feed network including respective second ports, said second feed network configured to inductively couple signals within a second frequency band between said respective second port and said radiating patches;
an intermediate metallization layer disposed between said top dielectric and said bottom dielectric, wherein said intermediate metallization layer including slot openings for inductively coupling signals within said second frequency band between said antenna array patches and said second feed network; and
a configuration for excitation of the radiating element to thereby obtain a reduction of side lobe power of at least about 15 dB relative to a main beam.

90. An antenna assembly, comprising:
an antenna array housing having a flat array antenna aperture;
a flat antenna array situated within said antenna array housing and aligned with said aperture in a manner that a normal axis to a plane of said antenna array extends through said aperture;
a surface of the housing positioned to substantially cover said aperture, wherein a distance of said surface of the housing and said antenna array is greater than a half wavelength at an operating frequency of said antenna array, the surface of the housing being spaced from the antenna array at one end of the array a distance greater than the spacing from the array at an opposite end of the array; and
the antenna array including
a top dielectric having a top metallization layer patterned into antenna array patches and a first feed network having respective first ports, said first feed network configured to inductively couple signals within a first frequency band between said antenna array patches and said first ports;
a bottom dielectric having a bottom metallization layer patterned into a second feed network including respective second ports, said second feed network, configured to inductively couple signals within a second frequency band between said second port and said array patches of the top dielectric;
an intermediate metallization layer disposed between said top dielectric and said bottom dielectric, wherein said intermediate metallization layer includes openings for inductively coupling signals within said second frequency band between said antenna array patch and said second feed network, said patches being in a diamond configuration; and
such that, without tapering, there is a reduction of side lobe power of at least about 17 dB relative to a main beam.

91. The antenna assembly of any one of claims 40, 74, 75, 76, 88, 89 or 90 wherein the surface of the housing is substantially planar.

92. The antenna assembly of any one of claims 40, 74, 75, 76, 88, 89 or 90 wherein the antenna array is used for transmitting a first signal and receiving a second signal.

93. The antenna assembly of any one of claims 40, 74, 75, 76, 88, 89 or 90 wherein the surface of the housing and the antenna array housing form a trapezoidal cross section.

94. An integrated satellite earth station, comprising:
an antenna array for receiving a received signal and transmitting a transmit signal;
a radio assembly coupled to said antenna array, for downconverting said received signal to a baseband received signal and/or upconverting a baseband transmit signal into said transmit signal;
a baseband electronic circuit for processing said baseband received signal and processing said baseband transmit signal, the received signal and transmit signal having orthogonal polarizations;
a housing for integrally housing said antenna array, said radio assembly and said baseband electronic circuit; and
the antenna array including
a top dielectric having a top metallization layer patterned into an antenna array radiating patches and a first feed network having respective first ports, said first feed network configured to inductively couple signals within a first frequency band between said antenna array radiating patch and said respective first ports;
a bottom dielectric having a bottom metallization layer patterned into a second feed network including respective second ports, said second feed network configured to inductively couple signals within a second frequency band between said respective second ports and said radiating patches, the patches being located in a diamond configuration;
an intermediate metallization layer disposed between said top dielectric and said bottom dielectric, wherein said intermediate metallization layer including openings for inductively coupling signals within said second frequency band between said antenna array patches and said second feed network; and
the antenna array being substantially a square and being arranged substantially as a diamond configuration microstrip and the patches being arranged to be horizontally and vertically disposed thereby to achieve horizontal and vertical polarization along diagonals of the substantially square array antenna.

95. A physically and electronically integrated satellite earth station, comprising:
an antenna array for receiving a received signal and/or transmitting a transmit signal, the received signal and transmit signal having orthogonal polarizations;
a radio assembly coupled to said antenna array, for downconverting said received signal to a baseband received signal and/or upconverting a baseband transmit signal into said transmit signal;
a baseband electronic circuit for processing said baseband received signal and processing said baseband transmit signal the received signal having orthogonal polarizations;
a housing for integrating said antenna array, said radio assembly and said baseband electronic circuit;
a surface of the housing being substantially planar to substantially cover the array, the surface of the housing being spaced from the array by at least a half wavelength of the operating frequency of the array; and
the antenna array including
a top dielectric having a top metallization layer patterned into an antenna array patches and a first feed network having respective first ports, said first feed network being configured to inductively couple signals within a first frequency band between said antenna array patches and said respective first ports;
a bottom dielectric having a bottom metallization layer patterned into a second feed network including respective second ports, said second feed network configured to inductively couple signals within a second frequency band between said respective second ports and said patches;
an intermediate metallization layer disposed between said top dielectric and said bottom dielectric, wherein said intermediate metallization layer includes slot openings for inductively coupling signals within said second frequency band between said antenna array patches and said second feed network; and
the antenna array being substantially a square and being arranged substantially as a diamond configuration and the patches being arranged to be horizontally and vertically disposed thereby to achieve horizontal and vertical polarization along diagonals of the substantially square array antenna aperture.

96. The satellite earth station of either claim 94 or 95, wherein said antenna array is positioned with said housing so as to shield said radio assembly and said baseband electronic circuit from direct sunlight during the operation of said antenna assembly.

97. The satellite earth station of either claim 94 or 95, wherein the surface of the housing and the antenna array housing form a trapezoidal cross section.

98. A physically and electronically integrated satellite earth station, comprising;

an antenna array for receiving a received signal and/or transmitting a transmit signal, the received signal and transmit signal having orthogonal polarizations;

a radio assembly coupled to said antenna array, for downconverting said received signal to a baseband received signal and/or upconverting a baseband transmit signal into said transmit signal;

a baseband electronic circuit for processing said baseband received signal and processing said baseband transmit signal the received signal having orthogonal polarizations;

a positioner for mounting said antenna array, said radio assembly and said baseband electronic circuit;

a surface of the housing being substantially planar to substantially cover the array, the surface of the housing being spaced from the array by at least a half wavelength of the operating frequency of the array; and the antenna array including a top dielectric having a top metallization layer patterned into an antenna array patches and a first feed network having respective first ports, said first feed network being configured to inductively couple signals within a first frequency band between said antenna array patches and said respective first ports;

a bottom dielectric having a bottom metallization layer patterned into a second feed network including respective second ports, said second feed network configured to inductively couple signals within a second frequency band between said respective second ports and said patches;

an intermediate metallization layer disposed between said top dielectric and said bottom dielectric, wherein said intermediate metallization layer includes slot openings for inductively coupling signals within said second frequency band between said antenna array patches and said second feed network; and the antenna array being substantially a square and being arranged substantially as a diamond configuration and the patches being arranged to be horizontally and vertically disposed thereby to achieve horizontal and vertical polarization along diagonals of the substantially square array antenna aperture.

99. The satellite earth station of claim 98, wherein said antenna array is positioned with said housing so as to shield said radio assembly and said baseband electronic circuit from direct sunlight during the operation of said antenna assembly.

100. The satellite earth station of claim 98, wherein the surface of the housing and the antenna array housing form a trapezoidal cross section.

* * * * *